Oct. 3, 1939.  L. B. M. BUCHANAN  2,174,776
REFRIGERATING APPARATUS
Filed Nov. 27, 1937

WITNESSES:
R.J. Ridge.
E. H. Lutz.

INVENTOR
LESLIE B.M. BUCHANAN.
BY
ATTORNEY

Patented Oct. 3, 1939

2,174,776

UNITED STATES PATENT OFFICE 2,174,776

REFRIGERATING APPARATUS

Leslie B. M. Buchanan, Springfield, Mass., assignor to Westinghouse Electric & Manufacturing Company, East Pittsburgh, Pa., a corporation of Pennsylvania Application November 27, 1937, Serial No. 176,907

11 Claims. (Cl. 62—4)

My invention relates to refrigerating apparatus and has for an object to provide improved apparatus of this character.

Another object of the invention is to provide an improved two temperature refrigerating system wherein defrosting of one of the cooling elements may be effected without materially affecting the temperature of the other cooling element.

It is a further object of the invention to periodically defrost the wall members or air cooling element of an evaporator structure without increasing, substantially, the temperature of its shelves or freezing element.

Figure 1:
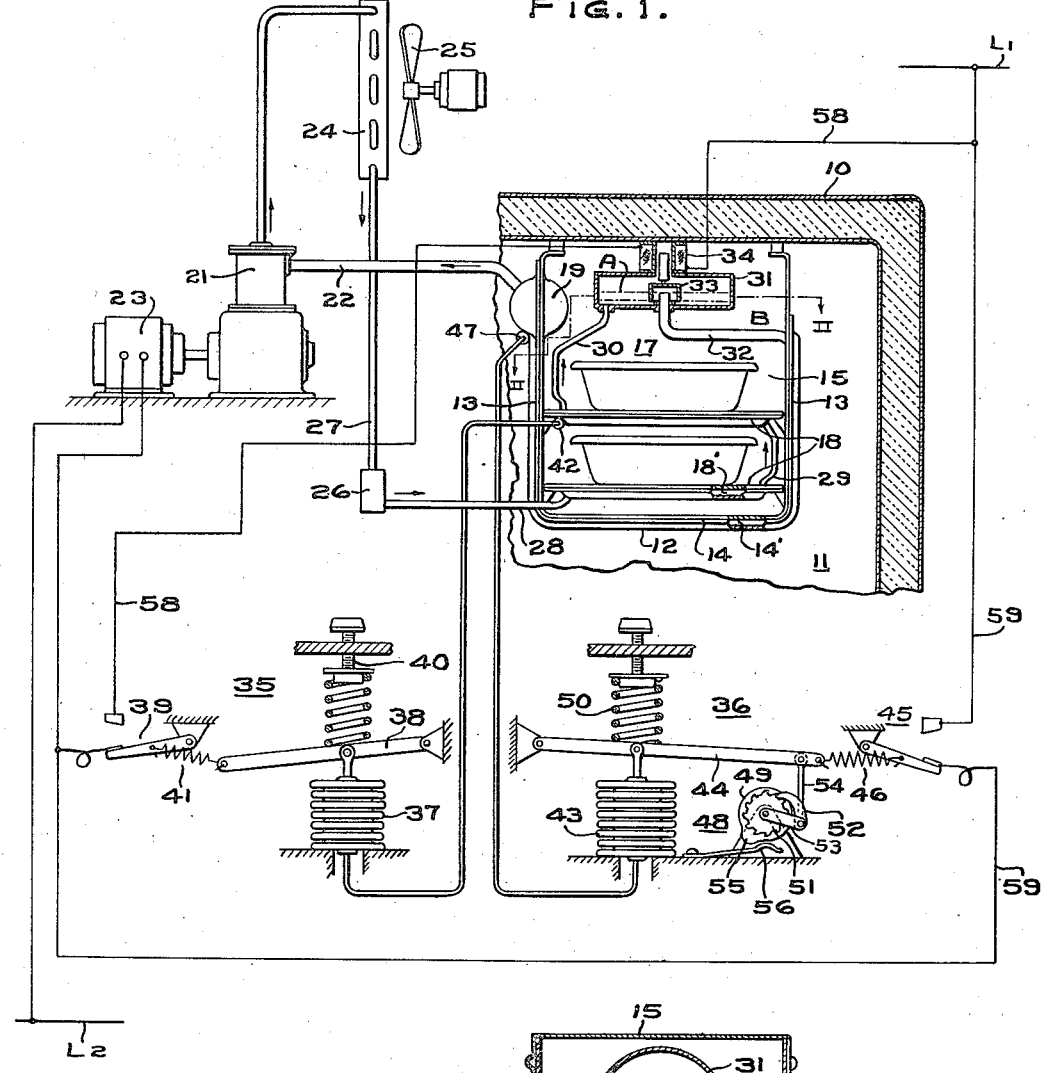
Figure 2:
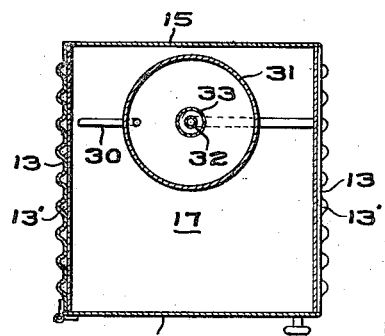

These and other objects are effected by my invention as will be apparent from the following description and claims taken in connection with the accompanying drawing, forming a part of this application, in which:

Fig. 1 is a diagrammatic view of a refrigerating system constructed and arranged in accordance with my invention; and, Fig. 2 is a sectional view taken along the line II—II of Fig. 1.

In the operation of refrigerators for the storage of food products, it is desirable that the humidity of the air in the food compartment be maintained at a relatively high value in order to prevent excessive dehydration of the food products. Humidification of the food compartment air and also the employment of large size evaporators, which may be operated at relatively high refrigerating temperatures, have been suggested for this purpose. The latter arrangement incurs a high manufacturing cost if the cabinet temperature is to be maintained at a value as low as 40° F. due to the large evaporator that is necessary.

Therefore, humidification of the food compartment air, for example, by the addition of moisture, in conjunction with a smaller evaporator appears to be a more satisfactory means of maintaining the moisture content of the air at a desirable value. In this event, however, the evaporator is usually operated at a refrigerating temperature below freezing for providing a food compartment air temperature of 40° F., and, therefore, is subject to frosting and the necessity of frequent defrosting.

In accordance with my invention, defrosting of the air cooling portion of the evaporator is periodically effected without materially affecting the temperature of the ice freezing portion thereof. The ice freezing portion of the evaporator may be operated during periods of defrosting of the air cooling portion of the evaporator. This is advantageous as the operator may require frozen products, such as ice, during a defrosting period, which operation may be effected in accordance with the invention.

Reference will now be had to the drawing for a description of the construction and operation of one form of my invention. In the drawing, the reference numeral 10 generally indicates a refrigerator cabinet of the domestic type having insulated wall members that define a compartment 11 for the storage of articles to be refrigerated. An evaporator structure is generally indicated at 12 and is disposed in the compartment 11, preferably near the top thereof. It includes a plurality of side wall members 13 and a bottom wall 14 having respective spaces 13' and 14' formed therein for refrigerant. The evaporator 12 includes a rear wall 15 and a door 16 hinged at the front of the evaporator. The walls 13, 14 and 15 define a chamber 17 which is maintained at a relatively low temperature, as described hereinafter. The door 16 provides access to the chamber 17.

One or more shelves 18 are arranged within the chamber 17 and are provided with refrigerant passages 18'. The shelves 18 define a low temperature evaporator for abstracting heat from the articles contained within the chamber 17. The evaporator portion defined by the wall members 13 and 14 forms a relatively high temperature evaporator portion for abstracting heat from the air in the compartment 11.

Refrigerant vaporized in the evaporator structure 12 is withdrawn through a conduit 22 from a header 19, preferably formed adjacent the top of one of the side wall members 13, by means of a compressor 21. The compressor 21 is preferably driven by an electric motor 23 and compresses the withdrawn vapor to a relatively high pressure and delivers it to a condenser 24. The latter is cooled in any suitable manner such as, for example, by a fan 25. Refrigerant condensed in the condenser 24 is delivered through a conduit 27 to a suitable expansion device shown at 26. The expansion device 26 may be of any well known type but, in the present embodiment, it will be considered as a conventional high side float valve.

The pressure of the condensed refrigerant is reduced at the expansion device 26 and flows through a conduit 28 to the lowermost shelf 18. The shelves 18 are preferably connected in series by means of a conduit 29. Refrigerant in condensed and vaporous forms passes from the uppermost shelf 18 through a conduit 30 to a container or reservoir 31 for condensed refrigerant.

The outlet of the reservoir is defined by a conduit 32 that communicates with the refrigerant passages 13' and 14' of the walls 13 and 14, the inlet of the conduit 32 being elevated above the bottom of the reservoir.

Passage of refrigerant from the container 31 to the conduit 32 is under control of a solenoid operated mechanism including an inverted cup 33 that is telescopically arranged with respect to the outlet 32, as shown best in Fig. 2. The cup 33 is shown in Fig. 1 in its lowermost position and may be raised by a solenoid, generally indicated at 34. When energized, the solenoid 34 maintains the cup 33 in an elevated position, wherein the bottom of the cup is higher than the top of the discharge conduit 32. At this time, condensed refrigerant is stored in the reservoir 31 at a level indicated by the broken line A.

The charge of refrigerant in the system is such that the walls 13 and 14 are devoid of condensed refrigerant at this time so that vaporization is effected in the shelves 18 for cooling articles in the low temperature chamber 17. Refrigerant vaporized in the shelves 18 passes through the conduit 30 and the reservoir 31, beneath the bottom of the cup 33 into the conduit 32 and thence to the passages 13' and 14' for withdrawal through the suction conduit 22. Some cooling of the walls 13 and 14 is effected by the passage of gas therethrough but it is relatively small and may be disregarded. Vaporization of refrigerant in the shelf passages 18' is affected at low pressure and temperature.

Refrigeration of the higher temperature evaporator portion defined by the walls 13 and 14 is effected during deenergized periods of the solenoid 34, or when the cup 33 is in its lowermost position. The storage of condensed refrigerant in the reservoir is not effected at this time as the suction of the compressor draws the condensed refrigerant from the reservoir 31 through the annular passage between the lowered cup 33 and the conduit 32 into the latter. The amount of refrigerant taken from the reservoir 31 is sufficient to substantially fill the wall passages 13' and 14'. Vaporization is effected in the wall passages 13' and 14' at relatively high pressure and temperature. The amount of heat abstracted from the shelves 18 at this time is relatively low unless they are subjected to a freezing load.

From the foregoing it will be apparent that liquid refrigerant is present in the low temperature shelf passages 18' and is vaporized therein at one time and, at another time, liquid refrigerant substantially fills the shelf passages 18' and the wall passages 13' and 14' and is vaporized therein at relatively high temperature and pressure. A two temperature system having an evaporator structure similar to that shown in the present application and a controlling device of the character shown at 33 is disclosed and claimed in my copending application Serial No. 87,424, filed June 26, 1936, and assigned to the assignee of the present application. It will be understood that the refrigerating system described heretofore defines but one of many systems that may be controlled in accordance with my invention, and that it is shown by way of example.

Control of the operation of the compressor 21 is effected by low and high temperature thermostats shown generally at 35 and 36 respectively. The thermostat 35 may include a conventional bellows 37 for actuating a main pivoted lever 38, the latter operating a switch 39 by means of a suitable snap-acting mechanism 41. The switch 39 is closed and opened in response to predetermined high and low temperatures of the shelves 18 or low temperature element. The bellows 37 is gas filled and includes a conventional bulb 42 for the condensed gas, preferably secured directly to one of the shelves 18. Control of the temperatures at which the thermostat opens and closes the switch 39 may be effected by an adjustment shown generally at 40.

The higher temperature thermostat 36 is similar in construction to the thermostat 35 and includes a bellows 43, a main lever 44 and a switch 45 actuated by the lever 44 by means of a snap-acting mechanism 46. A thermal responsive element or bulb 47 is associated with the bellows 43 and responds to temperatures produced by the wall members 13 and 14, preferably being directly attached to one of the wall members as shown. Adjustment of the temperature at which the thermostat operates is effected by the adjustable spring 50.

In accordance with my invention, means is provided for defrosting the higher temperature elements or walls 13 and 14 periodically. This is necessary as the evaporator walls 13 and 14 operate at temperatures below freezing for cooling the relatively high humidity air in the chamber 11 and, therefore, the formation of ice thereon is rapid. Any suitable means may be employed for periodically raising the temperature of the walls 13 and 14 to a value at which defrosting is effected. Preferably, the higher temperature thermostat 36 is periodically adjusted for a higher temperature setting automatically, so that defrosting occurs.

One form of adjusting mechanism is shown at 48 and includes a cam 49, driven by a ratchet wheel 51, a pawl 52 cooperating with the latter and movable with the lever 44. The pawl may be pivoted on an arm 53 that is oscillated by a link 54, the latter being pivoted to and movable with the lever 44. The cam 49 includes a raised portion 55 that periodically engages a spring 56 as the cam is revolved by the main lever 44. During operation, when the cam portion 55 is out of engagement with the spring 56, the switch 45 is opened and closed in response to temperatures determined by the adjustment of the spring 50. After a predetermined number of cycles has been effected, the cam portion 55 engages the spring 56 so that a higher temperature at the bulb 47 is required to produce the corresponding higher bellows pressure necessary to overcome the added resistance to the movement of the bellows 43 caused by the deflecting of the spring 56 by the cam portion 55.

The source of power for the motor 23 is represented by the line conductors $L_1$—$L_2$. The motor 23 may be energized by a pair of circuits, the first of which includes a conductor 58 having the solenoid 34 connected therein and controlled by the switch 39. The second circuit includes a conductor 59 controlled by the switch 45. It will be apparent that when both switches 39 and 45 are closed, the solenoid 34 is shunted by the conductor 59 and switch 45 so that the higher temperature thermostat 36 is given preference over the thermostat 35 when both call for cooling.

*Operation*

As shown, the thermostat switches 39 and 45 are open so that the compressor 21 is inactive. It will be assumed that the thermostat 36 initiates and terminates operation of the compressor at wall temperatures of 30° F. and 15° F., respectively, and that the thermostat starts and stops the compressor at shelf temperatures of 27° F. and 10° F., respectively.

When the wall temperature rises to 30° F., the thermostat 36 closes and initiates operation of the compressor 21. As the solenoid 34 is deenergized and the cup 33 is in its lowermost position, refrigerant in liquid form is present in the wall passages 13' and 14' and is vaporized therein as described heretofore. The refrigerant admitted to the shelf passages 18' is relatively warm and tends to heat the shelves 18. However, the pressure of the refrigerant in the evaporator passages 13'—14' and 18' is quickly depressed by the operation of the compressor so that the temperature of the shelves 18 will not exceed 27° F. unless their temperature were close to 27° F. at the time the compressor was started. In this connection, it will be understood that the temperature of the bulb 42 does not follow temperature changes of the refrigerant in the shelves 18 closely, since there is a time interval or lag between temperature changes of the refrigerant in the passages 18' and temperature changes of the bulb 42. Irrespective of whether or not the thermostat 35 is closed subsequent to the closure of the thermostat 36, the operation is the same for the present.

Operation of the compressor 21 continues until the temperature of the walls 13 and 14 has been depressed to 15° F. at which time the compressor is stopped by the thermostat 36. As the pressure and temperature of the refrigerant in the shelf passages 18' is substantially the same as the pressure in the walls 13 and 14, the shelf temperature at this time is also substantially 15° F. However, if the thermostat 35 closed its switch 39 due to the temperature of the shelves 18 increasing to 27° F. at the time of starting the compressor 21 by the thermostat 36, operation of the compressor will be continued by the thermostat 35 after the thermostat 36 is satisfied. The continued operation of the compressor is, of course, accompanied by energization of the solenoid 34 and storage of refrigerant in the reservoir 31. Accordingly, cooling of the shelves 18 is effected and operation of the compressor is terminated when the shelf temperature has been depressed to 10° F.

Operation of the compressor 21 may be initiated by the thermostat 35 in response to an increase in temperature of the shelves 18 to 27° F. due, for example, to the placing of a pan of water thereon for freezing. At this time, the solenoid 34 is energized and storage of refrigerant is effected in the reservoir 31. Accordingly, the shelves 18 only are refrigerated and substantially no cooling of the walls 13 and 14 is effected. Operation of the compressor for cooling of the shelves 18 is terminated by opening of the thermostat 35 in response to a shelf temperature of 10° F. During periods when the compressor is operated by the shelf thermostat 35, the walls 13 and 14 may require cooling due to a load being imposed thereon and, therefore, the thermostat 36 closes. As the thermostat 36 is given preference over the thermostat 35, the solenoid 34 is deenergized and, therefore, the walls 13 and 14 are refrigerated. After the thermostat 36 opens in response to a wall temperature of 15° F., the thermostat 35 will effect continued operation of the compressor 21 and energization of the solenoid 34 so that refrigeration of the shelves 18 is effected until their temperature has been depressed to 10° F.

The foregoing description relates to operation of the apparatus normally or when defrosting of the walls 13 and 14 is not effected. After a predetermined number of cycles has been completed during which a coating of ice has formed on the walls 13 and 14, the cam portion 55 of the thermostat 36 is engaged with the spring 56, so that a higher temperature of the walls 13 and 14 is necessary to effect closure of the thermostat 36, as described heretofore. The defrosting temperature at which the thermostat 36 closes its switch may be, for example, 38° F. During the periods when the wall temperature is high for defrosting, the shelf temperatures may increase to 27° F., and operation of the compressor is then effected by the thermostat 35. Also, the temperature of the shelves 18 will increase to 27° F. if they are subjected to a load for freezing. Accordingly, in either case, the compressor is operated to refrigerate the shelves 18, refrigerant being stored in the reservoir 31 during periods when the walls 13 and 14 are defrosting.

In the operation of the system, as described heretofore, it will be apparent that the shelves 18 are maintained at sub-freezing temperatures at all times or between 27° F. and 10° F. regardless of the wall temperatures. Furthermore, when the walls are being defrosted, freezing of liquids by the shelves 18 may be effected without affecting the defrosting operation.

A somewhat different operation of the apparatus may be effected by changing the relation of the temperature settings of the thermostats 35 and 36. Assuming the wall thermostat 36 to be adjusted for 30° F. on and 15° F. off as before and the shelf thermostat 35 to close at 20° F. and open at 10° F., the low temperature thermostat 35 would close subsequent to each closing operation of the high temperature thermostat 36. This is because the temperature of thermostat bulb 42 will be increased to 20° F. by the relatively warm refrigerant passed to the shelves 18 when the compressor is started by the thermostat 36. Refrigeration of the shelves 18 will, therefore, follow each operation of the compressor 21 by the wall thermostat 36. Accordingly, the temperature of the shelves 18 is depressed to 10° F. each time the compressor is operated. Operation of the compressor may be effected of course by the thermostat 35 if the shelves increase in temperature to 20° F. due for example to a freezing load being impressed on the shelves. Refrigeration of the shelves 18 may be effected during periods when the walls are being defrosted as described heretofore.

It will be apparent from the foregoing that I have provided an improved refrigerating system wherein the temperature of the low temperature element or shelves 18 is not materially affected by the defrosting of the higher temperature element or walls 13 and 14 and, furthermore, that quick freezing operations may be effected during periods when the walls 13 and 14 are being defrosted.

While I have shown a refrigerating system of the compression type controlled in accordance with my invention it will be understood that the showing is by way of example and that other types of refrigerating systems may be controlled equally well. Furthermore, I have shown a low temperature evaporating element disposed within the higher temperature element but it will be understood that these elements may be disposed in many various ways and operated in accordance with the invention.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of a cabinet enclosing a chamber to be cooled, an evaporator structure having a wall member for abstracting heat from the air in the chamber and including a shelf member for refrigerating media at sub-freezing temperatures, means for circulating refrigerant through the evaporator structure, temperature responsive means for controlling operation of the circulating means so that the mean temperatures of the wall member and the shelf member are maintained substantially constant at relatively high and low values respectively, and means for intermittently adjusting the control means for varying the operation of the circulating means whereby the mean temperature of the wall member is increased for melting frost thereon without substantially affecting the temperature of the shelf member.

2. In refrigerating apparatus, the combination of a cabinet enclosing a chamber to be cooled, an evaporator structure having a wall member for abstracting heat from the air in the chamber and including a shelf member for refrigerating media at sub-freezing temperatures, means for circulating refrigerant through the evaporator structure, temperature responsive means for controlling operation of the circulating means so that the mean temperatures of the wall member and the shelf member are maintained substantially constant at relatively high and low values respectively, means for manually adjusting the control means for varying operation of the circulating means whereby said mean temperatures of the wall member and the shelf member are selectively varied, and means for intermittently adjusting the control means for varying the operation of the circulating means whereby the mean temperature of the wall member is increased for melting frost thereon without substantially affecting the temperature of the shelf member.

3. In refrigerating apparatus, the combination of a cabinet enclosing a chamber to be cooled, an evaporator structure having a wall member for abstracting heat from the air in the chamber and including a shelf member for refrigerating media at sub-freezing temperatures, means for circulating refrigerant through the evaporator structure, first and second means responsive respectively to the temperatures of the wall and the shelf members for controlling operation of the circulating means and means for intermittently increasing the temperature to which said first temperature responsive means responds so that operation of the circulating means is varied to increase the temperature of the wall member without substantially affecting the temperature of the shelf member.

4. In refrigerating apparatus, the combination of relatively low and high temperature evaporating elements, means for circulating refrigerant through said elements, first and second means responsive to temperatures produced by the respective low and high temperature evaporating elements for controlling the operation of the circulating means, said temperature responsive means initiating and terminating operation of the circulating means in response to predetermined high and low temperatures, respectively, and automatically operated means for intermittently raising the temperature to which one of said temperature responsive means responds to initiate operation of the circulating means, whereby frost, formed during normal operation, is melted from the evaporator associated with said one temperature responsive means.

5. Refrigerating apparatus comprising relatively low and high temperature evaporators, means for circulating refrigerant through the evaporators, first and second elements responsive, respectively, to the temperature of the low and high temperature evaporators for controlling the operation of the circulating means, said temperature responsive elements initiating operation of the circulating means in response to predetermined high temperatures of their associated evaporators and terminating operation of the same in response to predetermined low temperatures of their associated evaporators, and means for intermittently increasing the temperature to which said second temperature responsive means responds to initiate operation of the circulating means, whereby the temperature of the high temperature evaporator is increased to a value at which melting of frost formed thereon is effected.

6. Refrigerating apparatus comprising relatively low and high temperature evaporators, means for circulating refrigerant through the evaporators, first and second temperature elements responsive, respectively, to the temperatures of the low and high temperature evaporators for controlling the operation of the circulating means, said temperature responsive elements initiating operation of the circulating means in response to predetermined high temperatures of their associated evaporators and terminating operation of the same in response to predetermined low temperatures of their associated evaporators, and automatically operated means for intermittently increasing the temperature to which said second temperature responsive means responds to initiate operation of the circulating means, whereby the temperature of the high temperature evaporator is increased to a value at which melting of frost formed thereon during normal operation is effected.

7. In refrigerating apparatus, the combination of means defining a cooling chamber, an evaporator structure having walls defining a relatively high temperature cooling element for abstracting heat from air in said chamber, said walls defining a freezing chamber therebetween, a shelf defining a relatively low temperature cooling element for abstracting heat from the freezing chamber, means for circulating refrigerant through said walls and shelf for evaporation therein and first and second temperature responsive means associated with the walls and shelf for controlling the operation of the circulating means, said first temperature responsive means including means for intermittently increasing the temperature to which it responds to control the circulating means whereby operation of the circulating means is varied and the temperature of the walls is increased to a value at which melting of frost formed thereon is effected.

8. In refrigerating apparatus, the combination of means defining a cooling chamber, an evaporator structure having walls defining a relatively high temperature cooling element for abstracting heat from the air in said chamber, said walls defining a freezing chamber therebetween, a shelf defining a relatively low temperature cooling element for abstracting heat from the freezing chamber, means for circulating refrigerant through said walls and shelf for selectively effecting evaporation therein and a thermostat responsive to predetermined high and low temperatures of the walls for starting and stopping operation of the circulating means, a second thermostat responsive to predetermined high and low temperatures of the shelf for starting and stopping operation of the circulating means, and means for automatically adjusting said first-mentioned thermostat intermittently, for raising at least one of said temperatures to which it responds whereby operation of the circulating means is varied and the mean temperature of the wall is increased for melting frost formed thereon.

9. In refrigerating apparatus, the combination of means defining relatively low and higher temperature refrigerating chambers, relatively low and higher temperature evaporators for abstracting heat from the respective low and higher temperature chambers, means for translating refrigerant through the evaporators, first and second means responsive to the temperatures of the low and higher temperature evaporators for controlling the operation of the refrigerant translating means, and automatically operated means for intermittently increasing the temperature to which said second temperature responsive means responds whereby operation of the refrigerant translating means is varied and the temperature of the high temperature evaporator is increased without affecting the temperature of the low temperature evaporator.

10. In refrigerating apparatus, the combination of relatively low and high temperature evaporators, means for circulating refrigerant through the evaporators and including means for conveying condensed refrigerant to the evaporators so that it flows into higher temperature evaporators only after it has substantially filled the lower temperature evaporator, mechanism for varying the effective change of refrigerant circulated by the circulating means and movable to a first position wherein condensed refrigerant is delivered to the low temperature evaporator for vaporization at relatively low pressure, and to a second position wherein condensed refrigerant is delivered to both evaporators for vaporization primarily in the high temperature evaporator at relatively high pressure, first means responsive to the temperature of the low temperature evaporator for controlling operation of the circulating means and for adjusting said mechanism to its first position, second means responsive to the temperature of the high temperature evaporator for control operation of the circulating means and for adjusting the mechanism to its second position and means for intermittently raising the temperature to which the said second temperature responsive means responds to initiate operation of the circulating means, whereby the temperature of the high temperature evaporator is raised without affecting the temperature of the low temperature evaporator.

11. In refrigerating apparatus, the combination of means defining a compartment to be cooled, a relatively high temperature evaporator disposed for cooling the air in the compartment and enclosing a relatively low temperature chamber, a relatively low temperature evaporator disposed within the low temperature chamber for refrigerating the same, means for supplying condensed refrigerant to said evaporators for selectively effecting vaporization therein and movable to a first position in which condensed refrigerant is delivered to the low temperature evaporator only for vaporization at relatively low pressure and to a second position in which condensed refrigerant flows to both evaporators for vaporization primarily in the higher temperature at relatively high pressure, first means responsive to the temperature of the low temperature evaporator for controlling the supply of refrigerant thereto and for adjusting the supply means to said first position, second means responsive to the temperature of the high temperature evaporator for controlling the supply of refrigerant to the evaporators and for adjusting the supply means to said second position and automatically operated means for intermittently increasing the temperature to which said second temperature responsive means responds whereby the temperature of the higher temperature evaporator is increased and melting of frost fromed thereon is effected.

LESLIE B. M. BUCHANAN.

CERTIFICATE OF CORRECTION.

Patent No. 2,174,776.                                          October 3, 1939.

LESLIE B. M. BUCHANAN.

It is hereby certified that error appears in the printed specification of the above numbered patent requiring correction as follows: Page 2, first column, line 32, for the word "affected" read effected; page 5, second column, line 47, claim 11, for "fromed" read formed; and that the said Letters Patent should be read with this correction therein that the same may conform to the record of the case in the Patent Office.

Signed and sealed this 31st day of October, A. D. 1939.

(Seal)
                                                Henry Van Arsdale,
                                        Acting Commissioner of Patents.